(No Model.)

W. E. GOOD.
SHAFT BEARING.

No. 506,848. Patented Oct. 17, 1893.

WITNESSES:
Henry Drury
D. Shewart

INVENTOR:
William E. Good
by his atty.
Francis T. Chambers

UNITED STATES PATENT OFFICE.

WILLIAM E. GOOD, OF PHILADELPHIA, PENNSYLVANIA, ASSIGNOR TO THE SOUTHWARK FOUNDRY AND MACHINE COMPANY, OF SAME PLACE.

SHAFT-BEARING.

SPECIFICATION forming part of Letters Patent No. 506,848, dated October 17, 1893.

Application filed February 13, 1893. Serial No. 462,008. (No model.)

*To all whom it may concern:*

Be it known that I, WILLIAM E. GOOD, a citizen of the United States, residing at Philadelphia, in the county of Philadelphia and State of Pennsylvania, have invented a certain new and useful Improvement in Shaft-Bearings, of which the following is a true and exact description, reference being had to the accompanying drawings, which form a part of this specification.

My invention relates to bearings for shafts and has for its object the construction of a shaft bearing which will not bind the shaft in case the bearing becomes heated and expands, and is especially adapted for very rapidly revolving shafts.

A further object is to facilitate the removal of the shaft bearing.

The usual method heretofore of constructing bearings has been to insert a bearing neatly in a recess of the bed or pillow block; this bearing however when it becomes heated of course tends to expand, and being restrained by the walls of the bed its sides are forced together binding the shaft and giving occasion for hot boxes and ruined bearings. These evils are obviated in my improved bearing where means for firmly holding the same are used, which at the same time permit it to freely expand and prevent it binding on the shaft.

The leading feature of my invention consists in so constructing a shaft bearing that it will bear at one side against the bed and at the other side against the cap and so that the cap and bearing will move in the same direction as they both become expanded by heat.

The best means that I have contemplated to carry my invention into practice are illustrated in the accompanying drawings in which—

Figure 1:
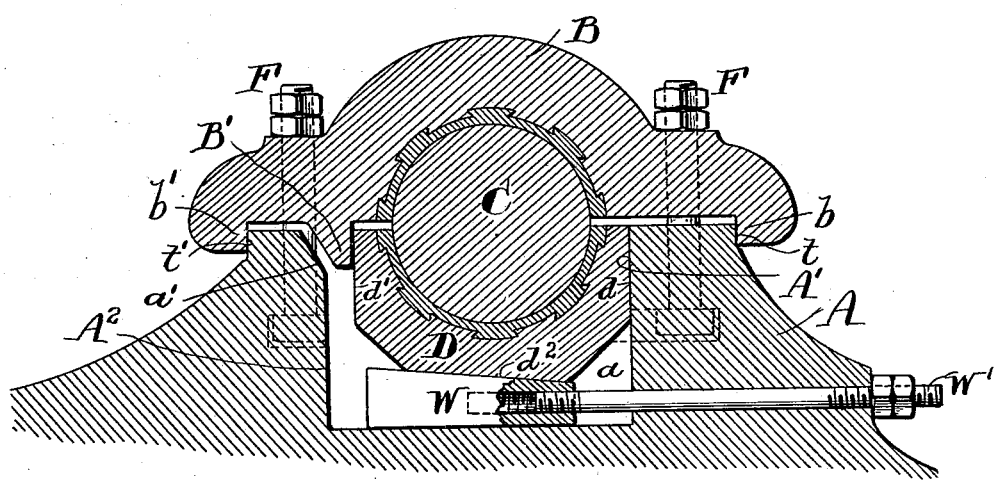
Figure 2:
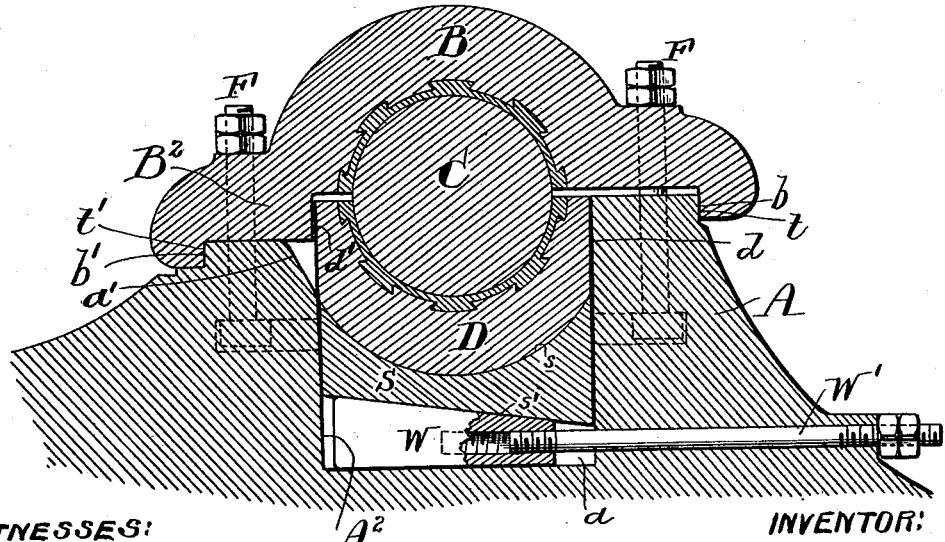

Figure 1 is a cross section showing one of my improved bearings, and Fig. 2 a similar view showing a modified arrangement.

A, represents a bed or pillow block which is provided with a recess $a$ to accommodate the removable bearing D and which bed is wider than the bearing to facilitate expansion and removal as will be explained hereinafter.

B, represents the cap of the block to which, as shown, it is fastened by bolts as F F and in the construction shown it is also provided with flanges $b$ $b'$ which fit over the shoulders $t$ $t'$ on the block A and also with a downwardly extending lug B' which projects into the recess $a$ of the bed or into an extension of said recess.

D is a shaft bearing which is supported on one side as at $d$ against wall A' of the block A and on the other side as at $d'$ against the cover B. The support on the side $d'$ of the bearing may be given by the projecting lug B' of the cover which extends into the recess $a$ of the block conveniently cut away as at $a'$ to receive it, or the side of the bed may be cut away as shown in Fig. 2 and the cap B extended as at $B^2$ so as to abut directly against the bearing D.

It is advisable to hold the cover firmly against the bearing D, and as shown, this is done by the flange $b$ on the cap which fits over a shoulder $t$ on that side of the bed A which the bearing D rests against, though a neatly fitting pin or bolt (or any convenient fastening device) might obviously be used to hold the cap firmly to the block on that side. The bearing D is, as will be seen firmly supported between the block on one side and the cap on the other when the parts are assembled. In case of the heating of the bearing, its two parts—the cap and removable bearing D—will both expand. The removable bearing D abutting as it does against the bed A on the side $d$ cannot expand in that direction, but will expand toward the side where it is supported by the cap, and the cap expanding at the same time will permit this very slight movement, the bolts F giving enough not to interfere, but it will still firmly support the bearing D against which it abuts. Thus both when the bearing is cold or when heated it will be firmly supported by the block and cap, but its sides will not be buckled and so bind the shaft. The bearing D may be supported on the bottom of the recess $a$ in the bed, but I prefer to support it by a removable support so that by removing this, the bearing D may be free to turn around the shaft and thus be readily removable at the side $A^2$ of the block after the cap is removed.

While any sort of removable bottom may be used to support the bearing D I prefer to use a support that may be vertically adjustable so as to take up for wear, and as means for doing this I prefer a wedge as W.

In using the wedge I make the side $d^2$ of the bearing D slightly inclined to conform to the shape of the wedge and by any convenient means as a bolt W' the bearing may be raised or lowered as desired. If desired a shoe as S (Fig. 2) may be interposed between the bearing and wedge, the shape of the face $s$ of the shoe preferably conforming to that of the removable bearing and its face $s'$ inclined to fit the wedge W. The bearing is made approximately circular in cross section and on account of this shape and of the space between the bearing and the wall $A^2$ of the recess the bearing can easily be removed by taking off the cap, slightly lifting the shaft, if necessary, and turning the bearing out from under the shaft. If the bearings are supported by a removable support or one vertically adjustable this may be removed or lowered, the cap taken from the block, and the bearing removed without the necessity of lifting the shaft.

While the bearings have been described and illustrated in connection with a pillow block, it is evident that the same construction may be used to advantage in a shaft hanger, or any other place where it is desired to support a revolving shaft, the hanger being mechanically considered a form of pillow block.

Having now described my invention, what I claim as new, and desire to secure by Letters Patent, is—

1. A shaft bearing having in combination a block, a removable bearing resting and supported by said block on one side, and a cap adapted to be secured to the face of the block and arranged to support the removable bearing on the opposite side.

2. A shaft bearing having in combination a block, a removable bearing resting against, and supported by said block on one side, a cap adapted to support the removable bearing on the other side, and means as a flange $b$ by which the cap is secured to the block on the side where the bushing abuts against it and so that the expansion of the cap will take place in the same direction as the expansion of the removable bearing.

3. In a shaft bearing the combination of a block, a cap having a downwardly extending lug B' and adapted to be secured to the face of the block, a removable bearing resting against and supported on one side by the block and on the other side by the lug B' on the cap, said block having a recess adapted to receive the removable bearing and also the lug on the cap.

4. The combination in a shaft bearing of a recessed block, a cap for the block, and a removable bearing with plain faces for bearing against the block and cap but otherwise of substantially circular cross section so that it may be removed from the block by turning it around the same.

5. In a shaft bearing a block having a recess $a$ whose walls are higher on one side than the other in combination with a cap adapted to be secured to the block and a removable bearing having faces which bear on one side against the block and on the other side against the cap, said removable bearing being of approximately circular cross section so as to be readily turned around the shaft out of the recess.

6. A shaft having in combination a recessed block a cap adapted to be secured to the face of the block, a removable bearing adapted to be supported by the block on one side, and by the cap on the other and a movable support in the recess of the block to support the removable bearing beneath.

7. A shaft bearing having in combination a recessed block, a cap adapted to be secured to the face of the block, a removable bearing adapted to be supported by the block on one side, and by the cap on the other and a vertically adjustable support for said bearing in the recess of the block.

8. A shaft bearing having in combination a recessed block a cap adapted to be secured to the face of the block a removable bearing supported by the block on one side and by the cap on the other and a wedge in the recess of the block for supporting and adjusting said bearing.

W. E. GOOD.

Witnesses:
ALF. H. FABER,
FRANCIS T. CHAMBERS.